United States Patent [19]

Cook et al.

[11] Patent Number: 4,908,565
[45] Date of Patent: Mar. 13, 1990

[54] POWER GENERATING SYSTEM

[75] Inventors: Alexander Cook; Richard W. Reynolds, both of Rockford, Ill.

[73] Assignee: Sundstrand Corporation, Rockford, Ill.

[21] Appl. No.: 15,903

[22] Filed: Feb. 18, 1987

[51] Int. Cl.[4] .................. H02P 9/00; F02N 11/08
[52] U.S. Cl. .................... 322/10; 290/4 R; 322/32; 322/40
[58] Field of Search .............. 322/10, 11, 40, 29, 322/32; 290/4 R, 4 A

[56] References Cited

U.S. PATENT DOCUMENTS

| 3,070,741 | 12/1962 | Ford | 322/61 |
|---|---|---|---|
| 3,571,693 | 3/1971 | Riaz | 322/32 |
| 4,488,053 | 12/1984 | Cronin | 322/40 X |
| 4,572,961 | 2/1986 | Borger | 390/4 A X |
| 4,636,707 | 1/1987 | Law | 322/40 X |
| 4,663,581 | 5/1987 | Glennon | 322/52 |
| 4,694,187 | 9/1987 | Baker | 290/4 R |

Primary Examiner—R. J. Hickey
Attorney, Agent, or Firm—Wood, Dalton, Phillips, Mason & Rowe

[57] ABSTRACT

A power supply system for developing electrical power from variable-speed motive power produced by a prime mover includes a differential speed summer having a first shaft coupled to the prime mover and further having second and third shafts coupled to first and second generators, respectively, a power conditioner coupled to the second generator for conditioning the power developed thereby and means for regulating the conditioned power developed by the second generator so that the first generator develops constant-frequency AC power.

64 Claims, 9 Drawing Sheets

POWER GENERATING SYSTEM

DESCRIPTION

1. Technical Field

The present invention relates generally to power generating systems, and more particularly to a system for developing AC and DC output power from motive power developed by a variable-speed prime mover which utilizes a pair of generators wherein one of the generators develops fixed-frequency power and the other of which develops variable-frequency power.

2. Background Art

Power generating systems have been devised wherein both AC and DC output power are developed by a single generator which is driven by a prime mover. Typically, such generating systems include a mechanical constant speed drive coupled between the prime mover and the generator so that the alternating current power developed by the generator is of fixed frequency. Alternatively, in those systems where a constant speed drive is not used, the output of the generator is coupled to some type of power converter so that the variable-frequency alternating current power is converted to fixed-frequency power. Such a power converter may comprise, for example, a DC link inverter, a cycloconverter or the like.

In both types of systems, DC power is often obtained by a transformer rectifier unit (TRU) which rectifies a portion of the total generator output power. However, such rectification results in the generation of undesirable harmonics in the alternating current output. These harmonics necessitate the use of large and heavy output filters and develop electromagnetic interference (EMI). This EMI may be generated in large enough amounts to interfere with other circuitry in the vicinity and/or may necessitate the use of shielding. As a result, the system may be unusable in certain applications requiring low EMI, light weight and compact size, such as in aircraft.

Ford U.S. Pat. No. 3,070,741 discloses an electric generating apparatus which develops constant-frequency AC power from variable speed motive power provided by an aircraft engine. The apparatus includes a differential having a first shaft coupled to the engine, a second shaft coupled to a synchronous generator and a third shaft coupled to an electromagnetic machine having first and second sets of rotor and stator windings. The sets of rotor windings are physically and electrically coupled together. The output of the first set of stator windings is combined with the output of the synchronous generator to derive an output of the apparatus while the second set of stator windings is coupled through a static frequency changer to the output. During operation, the frequency changer is controlled so that the first set of stator windings delivers power at a constant frequency to the synchronous generator. The synchronous generator receives constant excitation from a DC source and is locked at a constant speed by the constant-frequency output of the first winding so that it develops constant-frequency power at the same frequency as the power developed in the first set of stator windings.

DISCLOSURE OF THE INVENTION

In accordance with the present invention, a power generating system for generating electrical power is highly efficient, yet light in weight and small in size.

More particularly, a power supply system for generating electrical power from variable-speed motive power developed by a prime mover includes first and second generators each having a motive power shaft and electrical power windings, a differential speed summer having motive power shafts coupled to the prime mover and to the motive power shafts of the first and second generators, a power conditioner for conditioning the total power developed by the second generator and means for regulating a parameter of the conditioned total power to cause the motive power shaft of the first generator to rotate at a constant speed. The first generator thereby generates AC power at a desired constant frequency for AC loads while the second generator develops variable-frequency AC power.

In a first form of the invention, the second generator is of the wound-field type and the regulating means includes means for controlling the excitation of the second generator in dependence upon the output of the first generator so that the torque balance imposed by the differential causes the shaft of the first generator to rotate at a desired speed.

In a second form of the invention, the second generator comprises a permanent magnet generator and the power conditioner includes a controllable rectifier coupled to the output of the second generator and a DC/DC converter coupled to the rectifier. The regulating means includes means for controlling the controllable rectifier and the DC/DC converter in dependence upon the output of the first generator. As before, the torque balance imposed by the differential causes the shaft of the first generator to rotate at a desired speed.

In a further form of the invention, the power conditioner includes an inverter coupled in parallel with the first generator and the regulating means includes means for controlling the inverter so that it produces output power at a desired output frequency Thus, the first generator is locked at the desired output frequency Means are responsive to the first generator power factor for controlling the first generator to minimize circulating currents between the first generator and the inverter If desired, a portion of the output power from the first generator may be rectified and applied in parallel with the DC power developed by the power conditioner. Further, this combined DC output power may be converted back into AC power by a DC/AC power converter and coupled in parallel with the AC output of the first generator. In this fashion, both machines are capable of supplying power to AC and DC loads.

Each embodiment of the present invention may also be utilized in a starting mode to start the prime mover. In this case, power from an external power source is applied either directly to the electrical power windings of the first generator or to the windings through the DC/AC power converter so that the motive power shaft of the first generator is accelerated. This in turn causes the motive power shaft of the second generator to rotate in a direction opposite to its direction of rotation when in the generating mode. Once a predetermined first generator shaft speed is reached, the first generator is connected directly to an external AC power source, if it is not already connected to such a source. An electrical load is then applied to the second generator which in turn causes torque to be developed in the differential. This torque is transferred through the differential to the prime mover to start same.

The power supply system of the present invention is capable of developing controlled constant-frequency AC power over a wide speed range even with widely changing loads and is capable of developing DC power in an efficient manner.

BEST MODE FOR CARRYING OUT THE INVENTION

Figure 1:
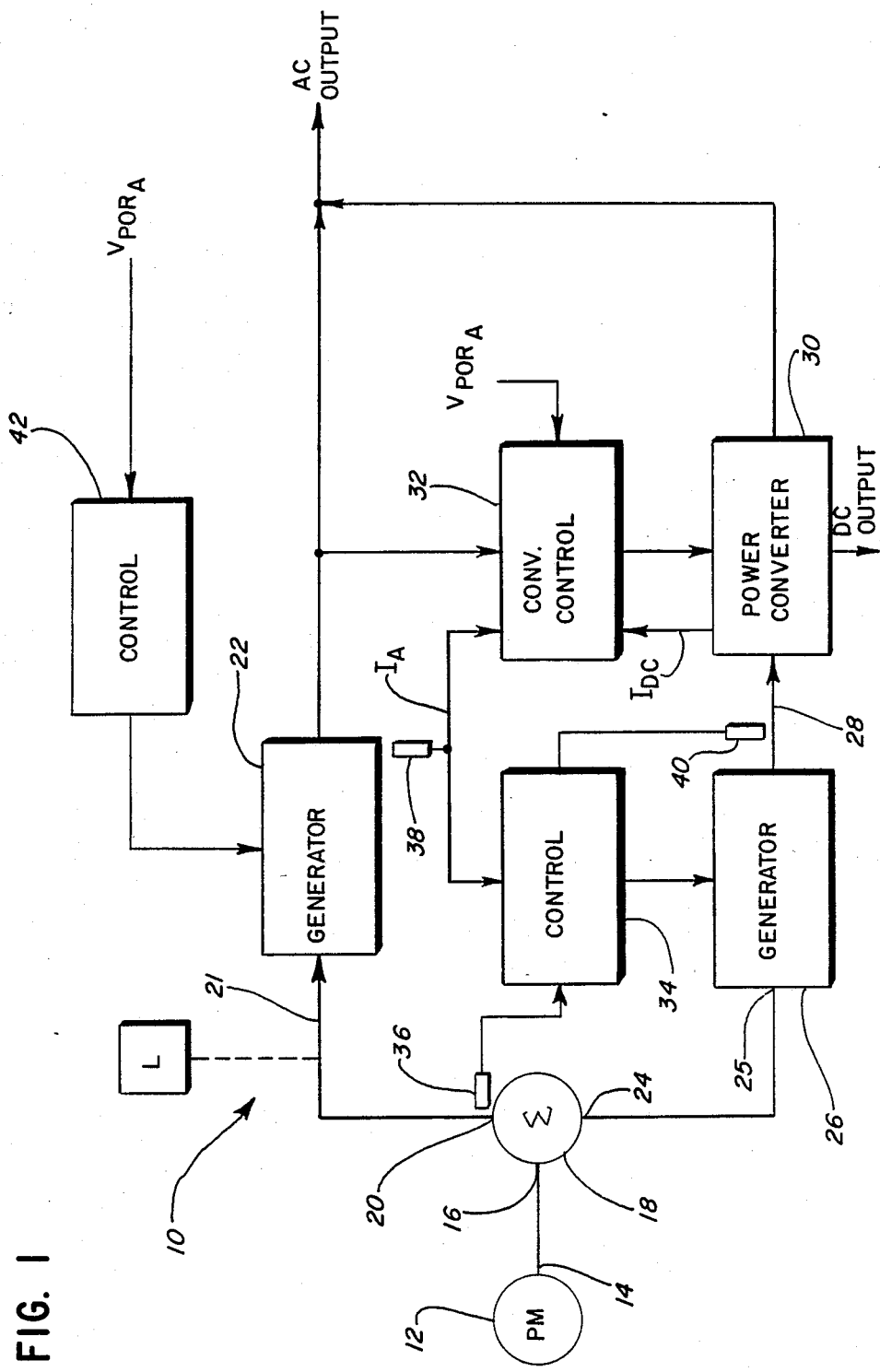
FIG. 1 is a block diagram of a power supply system according to the present invention.

Referring now to FIG. 1, a power supply system 10 according to the present invention is coupled to and driven by a variable-speed source of motive power such as a prime mover 12. The prime mover 12 includes an output shaft 14 which is coupled to a first or input shaft 16 of a mechanical differential speed summer 18. The differential 18 further includes a second shaft 20 which is coupled to a motive power shaft 21 of a first machine or generator 22. A third shaft 24 of the differential 18 is coupled to a motive power shaft 25 of a second machine or generator 26. The second and third shafts 20,24 are sometimes hereinafter referred to as output shafts of the differential 18.

The generator 26 includes power windings which are coupled by conductors 28 to a power conditioner or converter 30. The power conditioner or converter 30, in the preferred embodiment, conditions the total output power of the second generator 26 and operates under control of a converter control circuit 32.

The generator 26 is controlled by a generator control 34 (shown and described below in greater detail in connection with FIG. 3) which delivers field current to control the field excitation of the generator 26. The control circuit 34 is responsive primarily to the speed of the output shaft 20 of the differential 18, and more particularly receives a signal generated by a rotor position sensor 36, the output of which is differentiated by the control circuit 34 to derive a speed signal representing the speed of the shaft 20. As noted in greater detail below, the generator control 34 may also be responsive to other parameters of the generators 22,26, such as the output currents thereof as detected by a pair of current sensors 38,40.

It should be noted that the control 34 might alternatively be responsive primarily to the output frequency of the first generator 22, rather than the speed of the shaft 20.

The generator control 34 controls the output voltage of the generator 26 to in turn vary the speed of the differential output shaft 24 with changes in prime mover speed. The control 34 controls the speed of the shaft 24 so that the speed of the motive power shaft 21 of the first machine 22 is maintained at a desired speed. Thus, the first machine 22 generates substantially constant-frequency AC power even with changes in prime mover speed or load.

In the embodiment shown in FIG. 1, the power converter 30 is controlled by the converter control 32 to produce AC power at a constant phase relationship with respect to the output of the generator 22. The output of the power converter 30 is combined with the output of the generator 22 to produce AC output power at a system output.

The generator 22 is controlled by a generator control circuit 42 which accomplishes output voltage regulation.

The power converter 30 may be of the DC-link type comprising a rectifier circuit coupled to an inverter stage by a DC power link. If the converter is of this type, DC output power may be obtained directly from the DC link so that the power supply system comprises a hybrid source of power. However, it is believed in the system of FIG. 1 that withdrawing DC power from the power converter 30 restricts the load range over which the output of the generator 22 can be controlled. This is due to the fact that DC loads can only be supplied power from the second or wild-frequency generator 26. In the event DC loads are substantial, the drag imposed on the shaft 24 may be greater than the drag on the shaft 20 due to relatively light AC loads. This can in turn cause generator 22 to operate in an overspeed condition. If the loads to be driven by the power supply system 10 do not vary widely, the system can be designed to obviate this problem.

Figure 2:
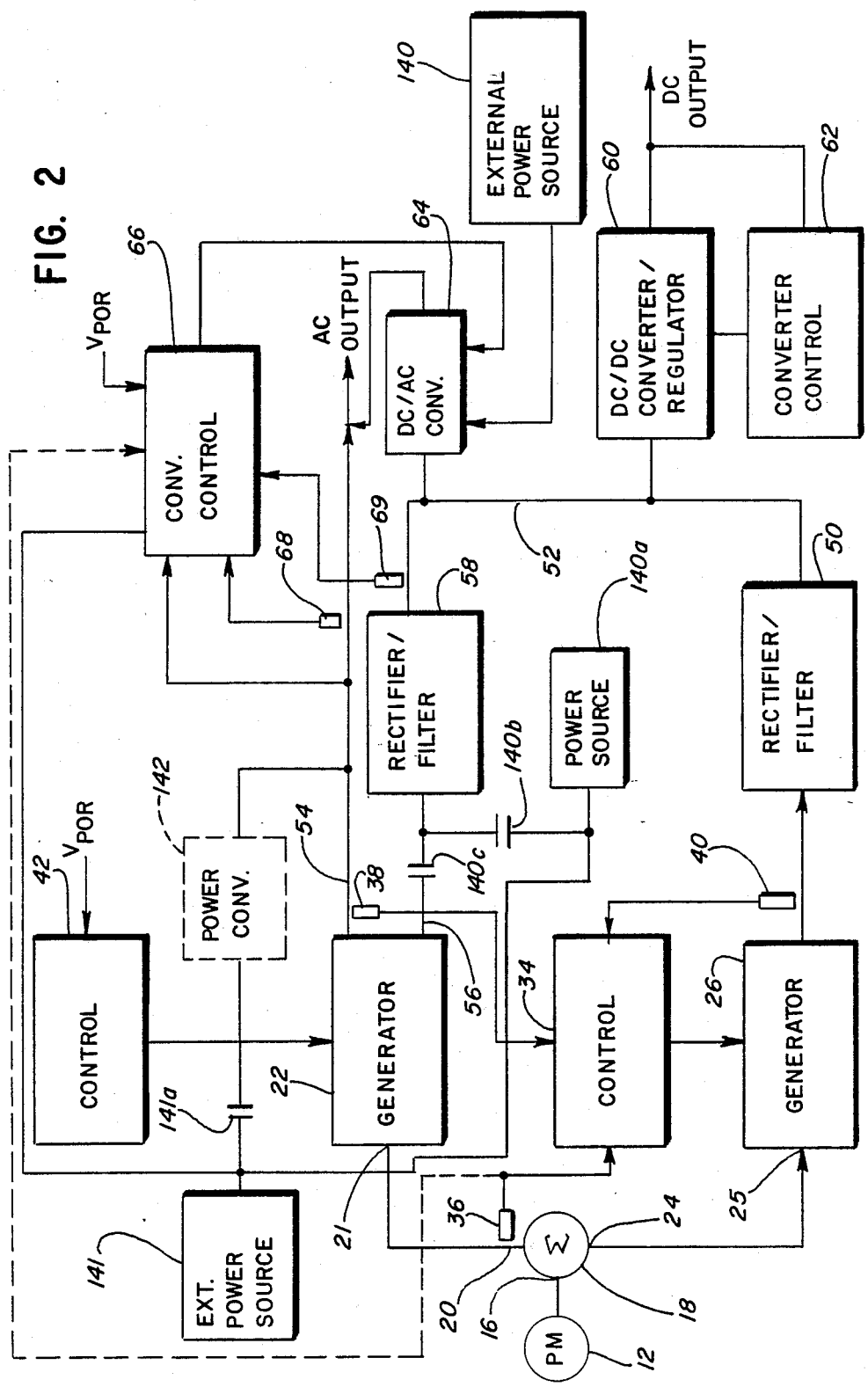
FIG. 2 is a block diagram of a further embodiment of the power supply system of the present invention.

Illustrated in FIG. 2 is a further embodiment of the invention which comprises a power supply system that develops AC and DC output power and which is not subject to the control problem noted with respect to the power supply system illustrated in FIG. 1. This is due to the fact that both generators 22 and 26 can provide power to AC and DC loads so that the drag on the shaft 20 can be controlled to maintain the speed of the shaft 20. Elements common to FIGS. 1 and 2 are assigned like reference numerals. The power supply system includes the differential 18 and the first and second generators 22, 26 controlled by the generator control circuits 42,34 described previously. In addition, the output of the generator 26 is coupled to a rectifier/filter circuit 50 which rectifies the variable-frequency output of the generator 26 and delivers the rectified and filtered DC power on a DC bus 52.

The first generator 22 includes first and second sets of windings which are coupled to sets of output lines 54,56 to provide first and second power outputs. The line 56 is coupled to a second rectifier/filter circuit 58 which rectifies the power on the line 56 and delivers same to the power bus 52. The outputs of the rectifiers 50,58 are combined on the power bus 52 to produce the DC output power of the power supply system. If necessary or desirable, a DC/DC converter/regulator 60 may be coupled to the power bus 52 so that a regulated DC output is produced. The converter/regulator is controlled by a converter control circuit 62 which is conventional in nature.

The power bus 52 is also coupled through a DC/AC converter (or inverter) 64 which converts the DC power on the bus 52 into AC power. The inverter 64 includes switches that are controlled by a converter control circuit 66 to synchronize the inverter output voltage with the voltage on the set of output lines 54 so that the required phase relationship is established therebetween. The control circuit 66 is responsive to the current on the line 54 as detected by a current sensor 68, the voltage VPOR on the line 54 at a point-of-regulation (POR) and the current at the output of the rectifier/filter 58 as detected by a current sensor 69.

As noted in connection with the previous embodiment, the excitation of the generator 26 is controlled to maintain the speed of the motive power shaft 21 constant so that the generator 22 develops constant-frequency AC power over the rated operational speed range of the prime mover (typically a 2:1 speed range).

The power supply system illustrated in FIG. 2 exhibits several advantages. Significantly, the system can be designed to maintain output frequency control over a wide range of load magnitudes and over a wide range of AC and DC load combinations. This is due to the fact that DC loads can draw power from both generators 22,26.

The DC power supply section utilizes rectifiers/filters which are smaller and lighter than alternative transformer-rectifier units. Also, the DC/AC converter 64 processes only AC power, and hence may be made smaller and lighter as compared with a DC-link converter which processes all of the AC and DC power.

Figure 3:
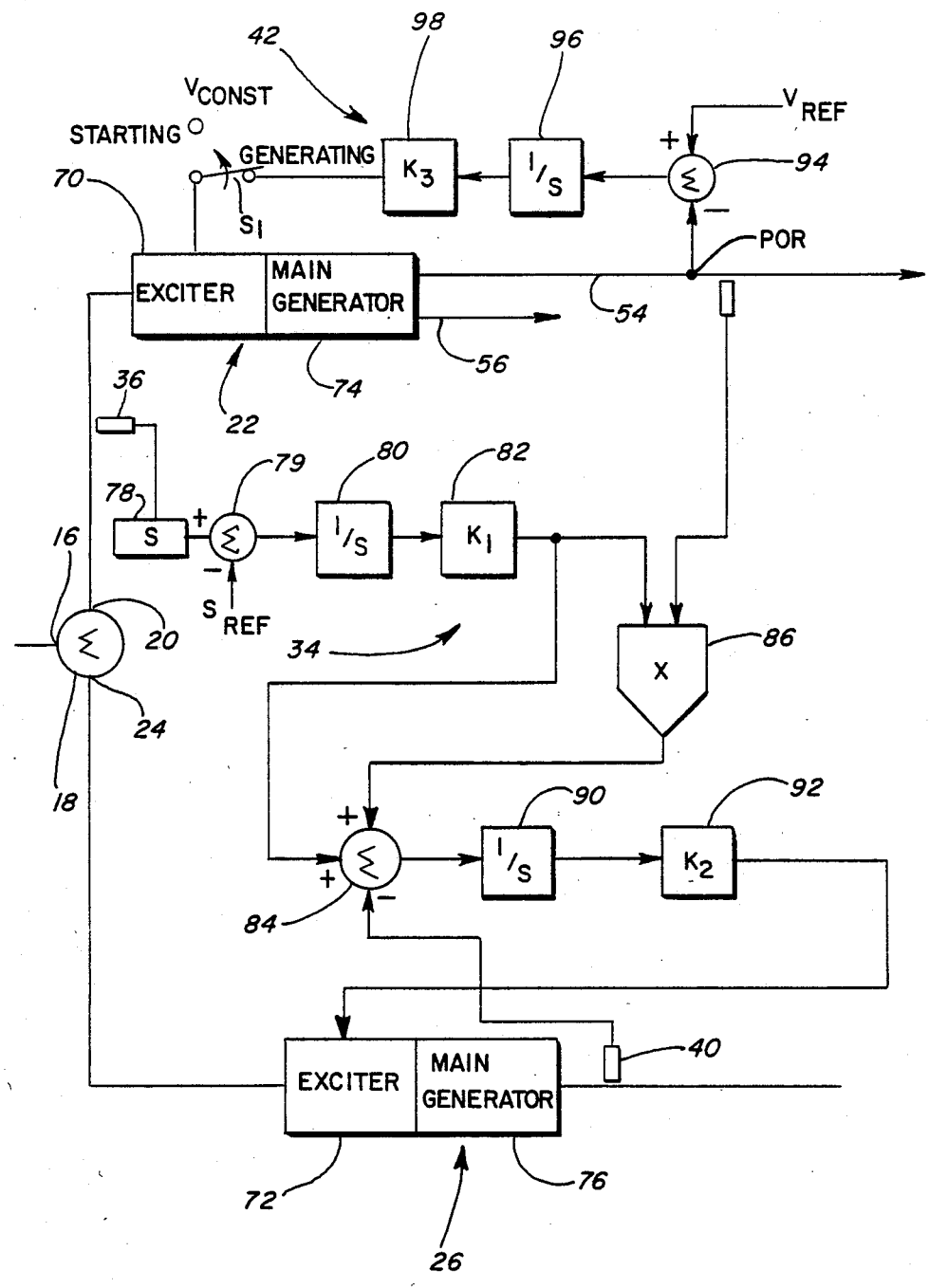
FIG. 3 is a block diagram of generator controls for controlling the generators illustrated in FIGS. 1 and 2.

Referring now to FIG. 3, there is illustrated in greater detail the generator control circuits 34 and 42 illustrated in FIGS. 1 and 2.

In the embodiment illustrated in FIG. 3, each generator 22,26 comprises a wound-field machine. Each of the machines 22,26 includes an exciter 70,72 and a main generator 74,76, respectively. In an alternative embodiment of the invention (FIG. 6), one or both of the machines 22,26 may comprise a permanent magnet generator, in which case the output of at least one of the generators is controlled by a regulator.

The control circuit 34 is primarily responsive to the speed signal developed by the rotor position sensor 36 and a differentiator 78. The speed signal is compared with a speed reference signal $S_{REF}$ by a summing junction 79 to develop a speed error signal. The speed error signal is integrated by an integrator 80 and is scaled by a scaling circuit 82 to derive a first input to a summing junction 84. The output of the scaling circuit is also passed to a first input of a multiplier 86 which receives at a second input thereof a current signal representing the current developed at the first power output 54 of the generator 22 as detected by the current sensor 38. The multiplier 86 develops a multiplied signal at an output which is coupled to a second input of the summing junction 84. A third inverting input of the summing junction 84 receives a current signal representing the current developed by the generator 26 as detected by the sensor 40. The output of the summing junction 84 is coupled to a further integrator 90 and a second scaling circuit 92 to develop an integrated error signal which controls the exciter 72 field current.

It should be noted that the control circuit 34 shown in FIG. 3 is exemplary only since there are other and/or different circuits for accomplishing the desired result.

The control circuit 42 may comprise, for example, a summing junction 94 which develops an error signal representing the difference between the voltage of the first power output on the line 54 as detected at the point-of-regulation (POR) and a desired or reference voltage $V_{REF}$. The error signal is integrated by an integrator 96 and is processed by a scaling circuit 98 to develop a control input for the exciter 70.

Figure 4:
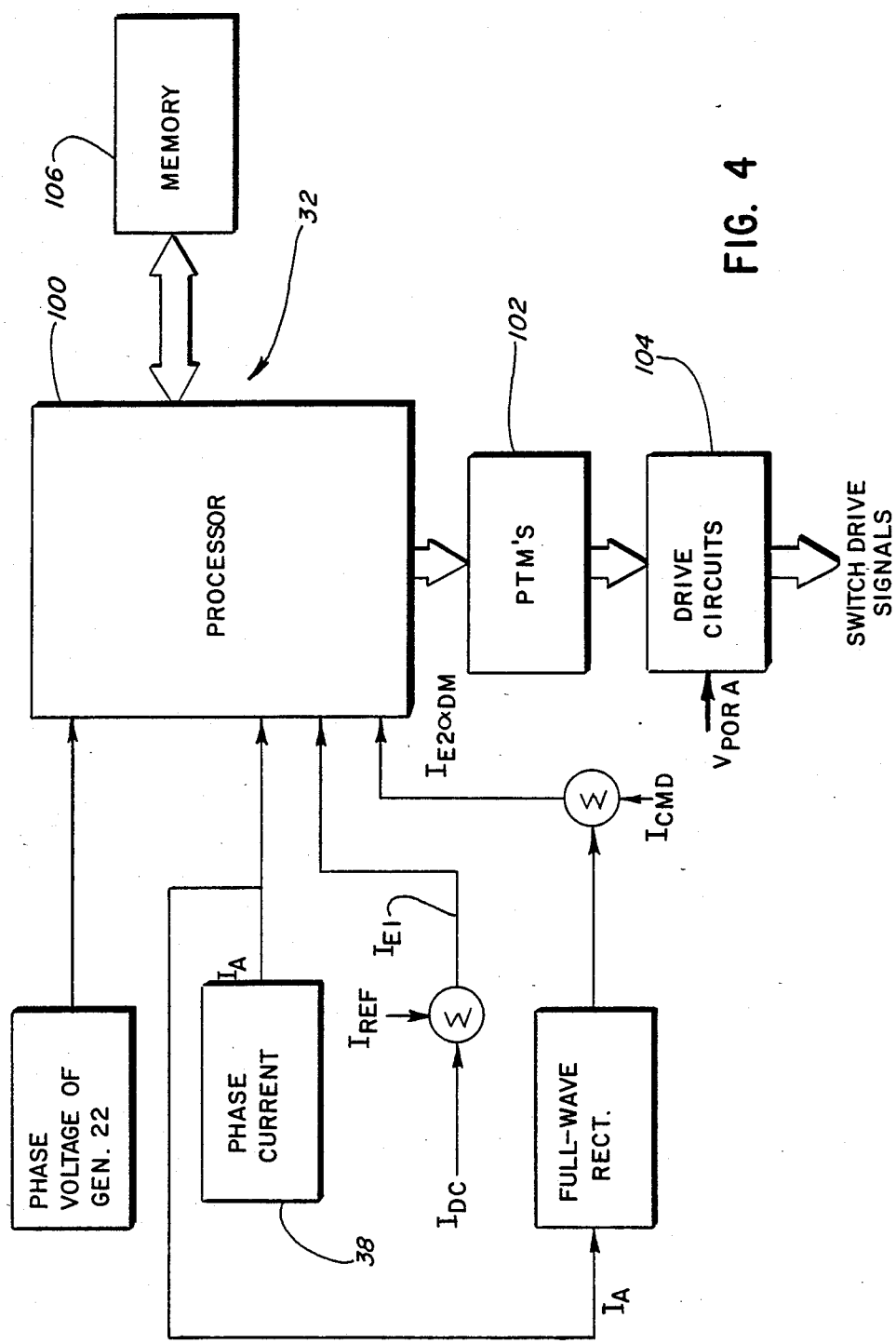
FIG. 4 is a block diagram of a converter control for operating either of the converters 30 or 64 illustrated in FIGS. 1 and 2, respectively.

Referring now to FIG. 4, there is illustrated in greater detail the converter control circuit 32 illustrated in FIG. 1. The converter control 32 is responsive to one of the phase voltages from the generator 22, one of the phase currents supplied to the load as detected by the current sensor 38, the DC current IDC in the DC link portion of the power converter 30 and one of the phase voltages $V_{PORA}$ at the point-of-regulation near the load.

The converter control 32 is described in Shekhawat et al, U.S. Pat. Application Ser. No. 672,305, filed Nov. 16, 1984, now U.S. Pat. No. 4,635,177, entitled "Control for a Neutral Point Clamped PWM Inverter" and assigned to the assignee of the instant application, the disclosure of which is hereby incorporated by reference. The inverter control described in the referenced application is modified somewhat as shown in FIG. 4 for use in controlling the converter 30.

A processor 100 determines the phase displacement of one of the phase output voltages of the generator 22, the phase displacement of one of the phases of the load current $I_A$ as detected by the current sensor 38, an error signal $I_{E1}$ representing the difference between the DC current $I_{DC}$ in the DC link of the power converter 30 and a reference current and an error signal $I_{E2}$ representing the difference between the amplitude of the phase current IA and a commanded current ICMD. The error signal IE2 is proportional to a parameter DM representing the depth of modulation. The processor solves equations utilizing the parameter DM to control switches in the inverter section of the power converter 30 so that the frequency and phase of the voltage from the power converter 30 is the same as the frequency and phase of the voltage from the generator 22. The processor 100 is also capable of compensating for the reactance of the load, if necessary or desirable.

The processor 100 is coupled to a pair of programmable timer modules or PTM's 102 which determine the points at which the switches in the inverter section of the converter 30 are changed between on and off states. The processor 100 adjusts these switching points "on line", i.e. as the inverter is operating. The PTM's 102 develop timing signals which are coupled to drive circuits 104 that develop switch drive signals for controlling the switches. The drive circuits 104 are responsive to the POR phase voltage $V_{PORA}$.

Figure 5:
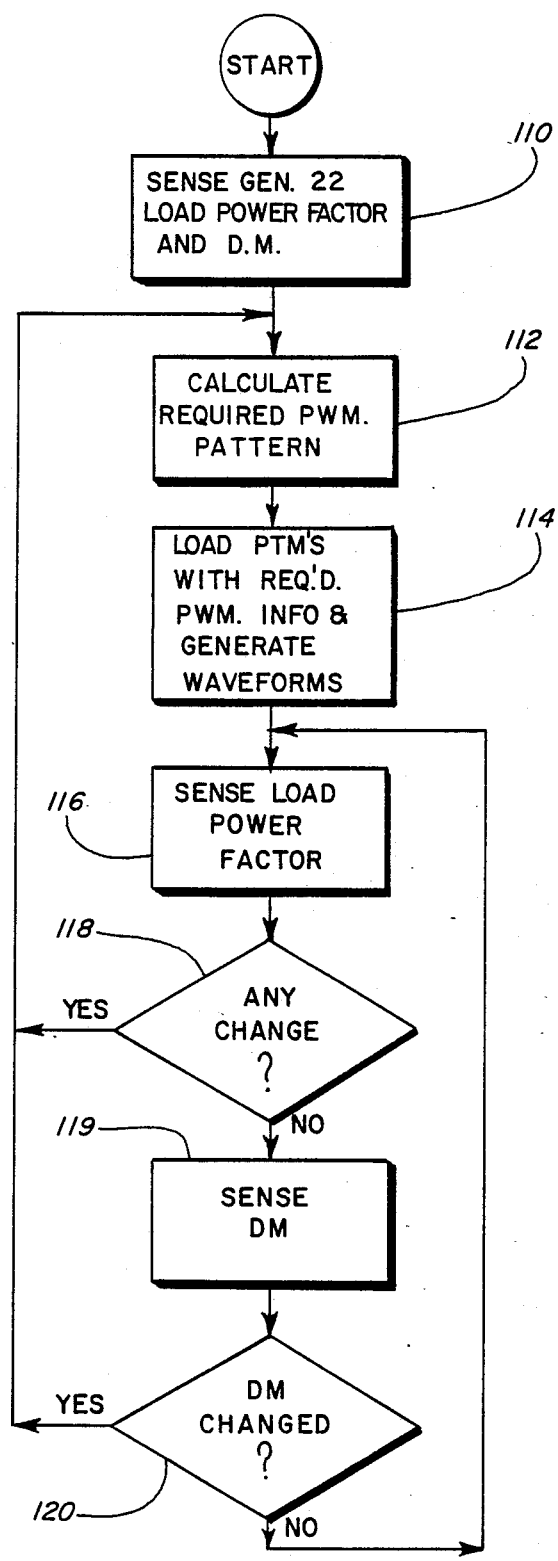
FIG. 5 is a flow chart illustrating the programming executed by the processor shown in FIG. 4.

The processor 100 executes a series of program steps which are illustrated in flow chart form in FIG. 5. As seen in this figure, the program executed by the processor 100 begins at a block 110 which senses the load power factor for one of the phases of the power delivered thereto and senses the parameter DM. The load power factor is determined by sensing the phase voltage and current and by comparing the relative phase displacement thereof. A block 112 then calculates the required PWM pattern for the switches in the inverter. A block 114 loads the PTM's 102 with the PWM pattern information calculated by the block 112 and generates the waveforms which are subsequently processed by the drive circuits before application to the switches.

A block 116 then again senses the generator 22 load power factor and a block 118 compares this against the previously detected power factor to determine if there has been any change. If not, a block 119 senses the parameter DM and a block 120 checks to determine whether it has changed since it was last detected. If not, control returns to the block 116. Hence, the waveforms developed by the PTM's 102 remain unchanged until the load power factor or the parameter DM changes.

If the block 118 determines that there has been a change in the load power factor or if the block 120 determines that there has been a change in the parameter DM, control returns to the block 112 which calculates a new PWM pattern.

It should be noted that the converter control 32 is exemplary only and may be replaced by another type of converter control, if desired.

The converter control 66 illustrated in FIG. 2 may be substantially identical to the converter control 32 described previously in connection with FIGS. 4 and 5, if desired. In this case, the control 66 is responsive to a phase voltage and current of the generator 22, the current $I_{DC}$ carried by the DC bus 52 as detected by the current sensor 69 and the POR voltage $V_{POR}$. Alternatively, the converter control 66 may be replaced by a different type of control.

The generating system shown in FIG. 2 may be operated in a starting mode to start the prime mover 12. This is accomplished in a broad sense by operating the generators so that they deliver torque through the differential to the prime mover.

More specifically, a source of external power 140, such as a DC power source, is applied to the DC/AC converter 64. The control 66 operates the converter 64 to increase the frequency of the output thereof from zero toward the synchronous frequency of the generator 22. During this time, constant excitation $V_{CONST}$ is provided to the exciter 70 of the generator 22, as symbolized by moving a wiper of a switch S1 (FIG. 3) to a starting position. The generator 22 thereafter accelerates toward rated speed. During this acceleration, the converter control 66 is responsive to the input current of the generator 22, as detected by the sensor 68, and the rotor position of the generator 22, as sensed by the rotor position sensor 36 (denoted by the dotted lines shown in FIG. 2). The speed of the motive power shaft 21 continues to increase until the inverter 64 output voltage is close in frequency and phase to the voltage developed by a source 141 of AC external power. Once this synchronization is accomplished, the source 141 is coupled to the windings of the main generator 74 by closing contactors 141a. The generator control 42 is thereafter operated to provide appropriate power to the exciter 70 to cause the generator 22 to operate as a synchronous motor. In the preferred embodiment, the generator 22 comprises a two-pole machine while the external power source 141 operates at 400 hertz. Therefore, the external power source 141 is applied to the generator windings 22 when the speed of the motive power shaft 21 reaches 24,000 rpm and when the phase of the voltage from the generator 22 is the same as the phase of the AC source 141. The speed of the motive power shaft when the power source is coupled to the generator 22 will be different if the external power source 141 operates at a different frequency or if the generator is other than a two-pole machine.

Synchronization may be detected by the converter control 66 which compares the voltage of one of the phases of the external AC power source 141 with the corresponding phase of the inverter 64 output voltage. The converter control 66 may also operate the contactors 141a once synchronization is accomplished.

It should be noted that the external power source 140,141 may instead be a single AC power source 140a operating at 400 hz. wherein a transformer rectifier unit (TRU) is coupled to the output of the power source to provide DC power to the inverter 64 as the generator 22 is accelerated. Once the generator 22 has reached the predetermined speed, the TRU is disconnected from the external power source and the source 140a is then directly applied to the windings of the generator 22.

The TRU may be replaced by the rectifier/filter circuit 58, in which case contactors 140b,140c operated by the converter control 66 would be used between the external power source 140a and the rectifier/filter circuit 58 and between the set of windings of the generator 22 and the circuit 58. When the power source 140a is to be connected to the circuit 58, the contactors 140b are closed and the contactors 140c are opened. When the power source 140a is to be connected directly to the first set of windings of the generator 22 over the line 54, the contactors 140b are opened and the contactors 141a are closed.

While the external AC power source 140a or 141 is directly connected to the generator 22 so that it is operating as a synchronous motor, the motive power shaft 25 of the generator 26 is rotating in a reverse direction as compared to its direction of rotation while in the generating mode. At this point, an electrical load is placed on the generator 26 so that the motive power shaft 25 decelerates. This in turn provides torque which is returned through the differential 18 to the prime mover 12 to cause it to accelerate.

The electrical load placed on the generator 26 is accomplished by operating the inverter 64 in synchronism with the power developed by the external power source 141 so that the power developed by the generator 26 is combined or summed with the external power provided by source 141. The control 34 operates in a closed-loop mode with the current sensor 40 to cause the generator 26 to provide an output current in accordance with a predefined torque and/or power schedule (noted in greater detail hereinafter) so that prime mover acceleration is controlled in a desired fashion.

Once the prime mover 12 reaches self-sustaining speed, the contactors 141a are opened and the electrical load on the generator 26 is removed by the control 34 Thereafter, the prime mover may accelerate until it reaches operating speed, at which time the generator controls 34,42 and the converter controls 62,66 can be operated so that the system operates in a normal or generating mode to supply electrical power to AC and/or DC loads.

Alternatively, the starting mode of operation may be initiated by shorting the fixed-frequency generator 22 field winding and applying 400 hz. external AC power to the output terminals of the generator 22 so that it operates as an induction motor. Power may instead be provided by the inverter 64 which is controlled to provide increasing voltage and frequency up to 400 hz. at a constant V/F ratio. Thus, the generator 22 is caused to accelerate, in turn accelerating the motive power shaft 25 of the generator 26 in the reverse direction. Once a predetermined speed is reached (e.g. the synchronous speed of the generator 22), a source of AC power is applied directly to the windings of the generator 22, if such a source is not already connected thereto. The generator 26 is then electrically loaded as previously described so that torque is returned through the differential 18 to the prime mover 12 to accelerate same to self-sustaining speed. This torque is proportional to the current of the generator 26 and may be controlled according to the previously-noted schedule by the inverter 64 to produce a desired torque and/or power relationship as a function of prime mover speed. One such relationship is to develop constant torque until a particular power level is reached, and thereafter develop constant power until self-sustaining speed is attained. This relationship may be altered as desired.

It should be noted that the inrush currents following application of the 400 hz. power to the generator 22 may cause a large transient to be developed in the AC power. This transient is reduced or eliminated by applying power through the inverter 64 at a constant V/F ratio, as noted above.

The starting mode may be further modified by using the wild-frequency generator 26 to bring the generator 22 up to rated speed before applying external power thereto. In this case, external power is applied to the generator 26 either directly or through a power converter and the field winding thereof is provided appropriate excitation so that the generator operates as a synchronous motor. Or, the field winding is shorted to operate the generator 26 as an induction motor. In either case, the generator 26 and the generator 22 are accelerated toward a predetermined speed.

The power generating system of FIG. 1 may also be used to start the prime mover. In this case the generators 22 and 26 are operated as noted above to develop torque which is returned through the differential 18 to bring the prime mover speed up to self-sustaining speed.

Figure 6:
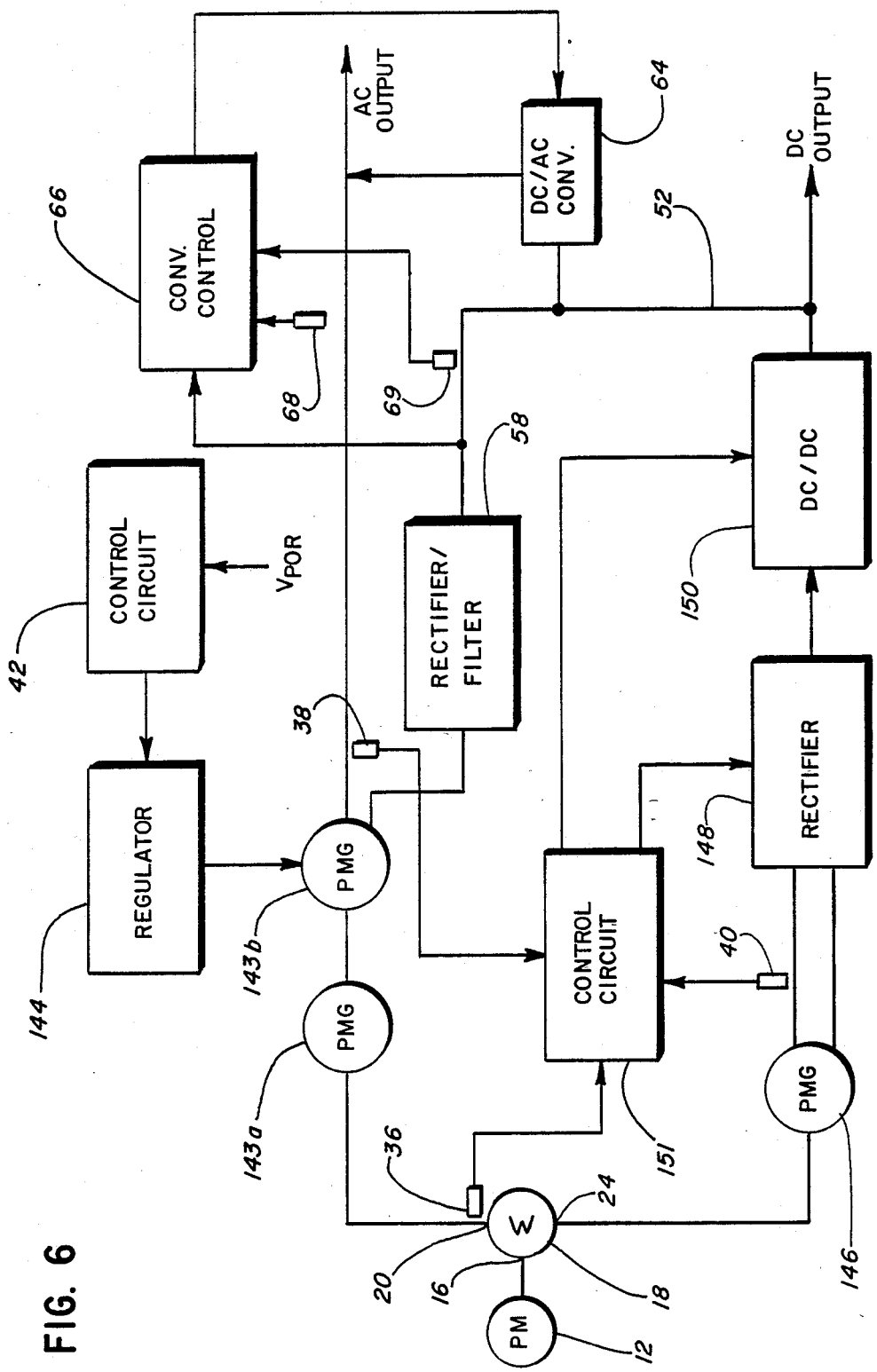
FIG. 6 is a block diagram of a further embodiment of the invention.

Referring now to FIG. 6, either of the embodiments illustrated in FIGS. 1 or 2 may be modified by replacing one or both of the wound-field generators 22,26 with permanent magnet generators. The circuit shown in FIG. 6 comprises a modification of the system illustrated in FIG. 2 and circuits common to the two figures are assigned like reference numerals.

The generator 22 is replaced by either a single permanent magnet generator (PMG) or, preferably, a dual PMG system including permanent magnet generators 143a,143b. The permanent magnet generators 143a,143b are polyphase machines having polyphase stator windings wherein each phase stator winding of one of the machines is connected in series with the corresponding phase stator winding of the other machine. Further, the PMG rotors are connected together to rotate at a constant common speed. The stator windings of the PMG 143b are movable relative to the stator windings of the PMG 143a under the influence of a regulator 144. The regulator 144 is in turn controlled by the control circuit 42 which senses the POR voltage. The regulator 144 comprises an actuator which is responsive to the output of the control circuit 42 to adjust the position of the stator of the PMG 143b relative to the stator of the PMG 143a so that the output voltage level of the PMG system is maintained at a desired level.

Figure 9:
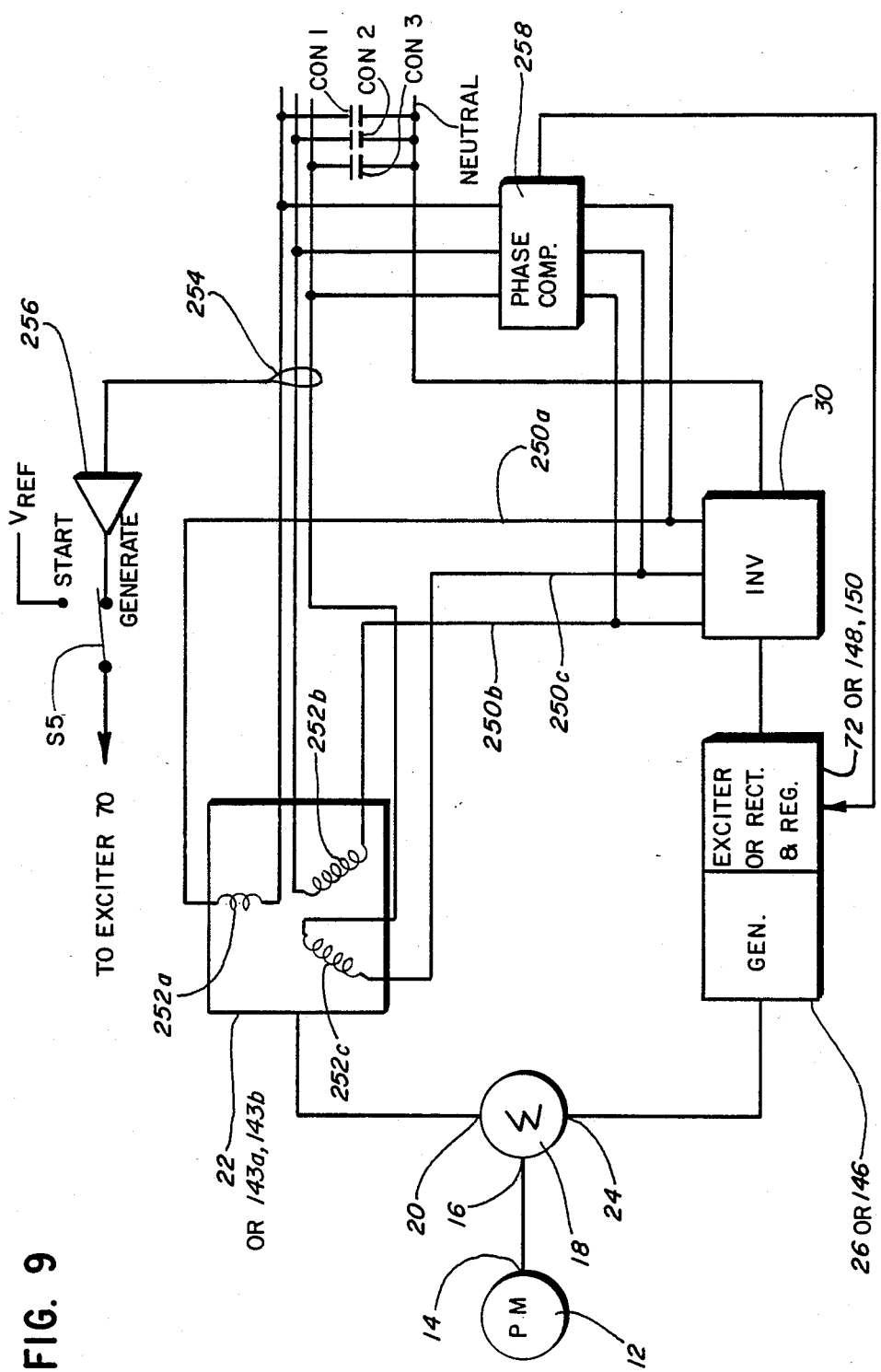

The dual PMG system is shown in FIGS. 9 and 10 of Glennon, U.S. Pat. Application Ser. No. 667,157, filed Oct. 31, 1984, now U.S. Pat. No. 4,663,581, entitled "Voltage Regulated Permanent Magnet Generator System" and assigned to the assignee of the instant application, the disclosure of which is hereby incorporated by reference. The system shown in FIGS. 9 and 10 of that patent application includes a control circuit (identified by the reference numeral 74) which is replaced by the control circuit 42 of the present invention.

The generator 26 is replaced by a permanent magnet generator 146 which, in the preferred embodiment, includes dual stator windings which are coupled to a controllable rectifier and filter circuit 148 and a DC/DC voltage converter 150 which is coupled to the DC power bus 52. The DC/DC converter 150 comprises a regulator which is responsive to a control circuit 151. Again, the regulation afforded by the DC/DC converter 150 is such as to maintain the speed of the differential shaft 20 at a constant speed so that the output of the dual PMG system comprising the generators 143a,143b is maintained at a constant desired frequency.

Figure 7:
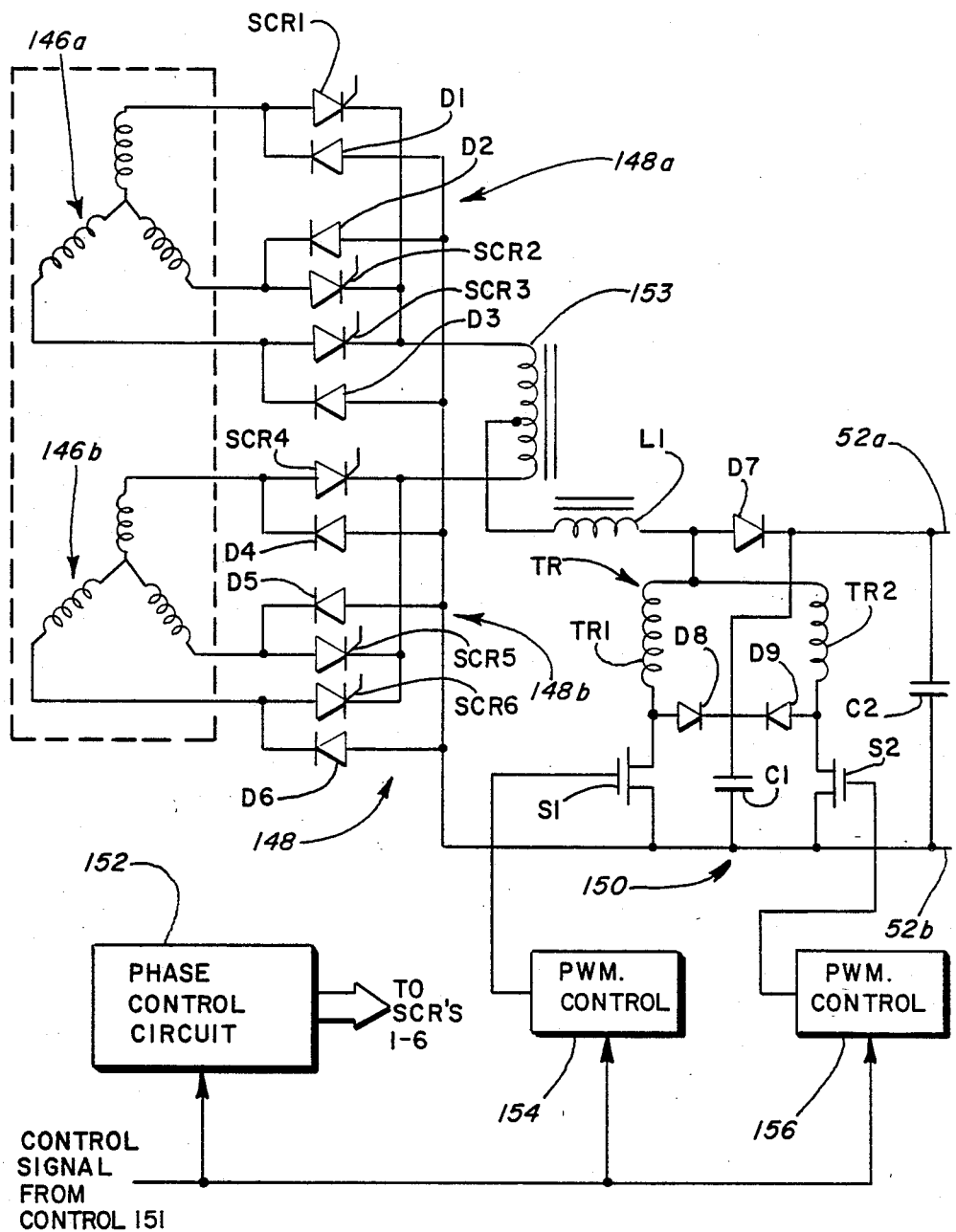
FIG. 7 is a combined schematic and block diagram of the PMG 146, rectifier 148 and DC/DC converter 150 illustrated in FIG. 6.

Referring now to FIG. 7, there is shown in greater detail the stator windings 146a, 146b of generator 146 together with the rectifier circuit 148 and the DC/DC converter 150. In the preferred embodiment, the DC/DC converter 150 comprises a controllable voltage boost converter.

The dual windings 146a,146b are coupled to first and second phase-controlled rectifier sections 148a,148b, each of which includes three diodes D1–D3 and D4–D6, respectively. Each section 148a,148b also includes three silicon-controlled rectifiers SCR1–SCR3 and SCR4–SCR6, respectively. As noted in greater detail below, the SCR's are operated by a phase control circuit 152 which is responsive to the control signal from the control circuit 34.

An interphase transformer 153 is coupled between the sections 148a,148b. An inductor L1 is coupled to the mid-tap of the interphase transformer 153. The inductor L1 is coupled through a diode D7 to the DC bus 52 (here shown as bus conductors 52a,52b). A transformer TR having windings TR1 and TR2, diodes D8,D9, capacitors C1,C2, and power MOSFET's S1,S2 are coupled between the inductor L1 and the power bus conductor 52a. The switches S1,S2 are operated by pulse-width modulation (PWM) control circuits 154,156 which are responsive to the control signal from the control circuit 151. The boost converter boosts the voltage developed at the output of the phase-controlled rectifier sections 148a,148b as needed to ensure that the PMG 146 operates at the necessary speed to keep the speed of the PMG's 143a,143b at the desired constant speed. The amount of boost provided by the DC/DC converter 150 is dependent upon the duty cycle of the switches S1,S2 as determined by the PWM control circuits 154,156. Briefly, each switch S1,S2 may be operated between 0% duty cycle, at which no boost is accomplished, and near 100% duty cycle, at which maximum boost is effected. When the switches S1,S2 are operated at zero duty cycle (i.e. a condition of no boost) and the combined output of the phase-controlled rectifier sections 148a,148b would result in a power level from the PMG 146 which is greater than that required to maintain the speed of the PMG's 143a,143b at the desired speed, the phase control circuit 152 phase controls the rectifiers SCR1–SCR6 to limit the combined output voltage developed by the sections 148a,148b to thereby maintain proper operation of the PMG 146.

The control circuit 151 may be identical to the control 34 described previously or may be modified as needed to achieve the desired operation. In all other respects, the circuit of FIG. 6 is identical to that described in connection with FIG. 2.

The embodiment of FIG. 1 may also be modified in a fashion similar to that shown in FIG. 6 so that one or both of the generators 22,26 are replaced by PMG's. Also, where dual PMG's are used, the rotors thereof may be relatively movable rather than the stators, if desired.

During operation of each of the foregoing embodiments, it may occur that the drag imposed on the shaft 24 by the generator 26 (FIGS. 1 and 2) or the generator 146 (FIG. 6) is greater than the drag on the shaft 20 imposed by the generator 22 or 143a,143b. While this condition exists, it may also occur that the DC and AC loads on the power generating system may drop to near zero. These conditions could in turn cause a loss of speed control over the generator 22 or 143a,143b and hence system output frequency may vary. One way to obviate this difficulty in each of the embodiments is to impose one or more loads on the motive power shaft of the generator 22 or 143a,143b so that the drag on the shaft 20 is always at least equal to the drag on the shaft 24. This may be accomplished by coupling mechanical loads thereto, such as oil pumps or the like. Thereafter, when little or no load is energized by the power generating system, the power developed by the generator 26 is returned to the generator 22 or 143a,143b to cause it to operate as a motor and thereby maintain its motive power shaft speed at the desired constant speed.

Alternatively, under the foregoing conditions and in the case of the embodiments shown in FIGS. 2 and 6, speed control over the motive power shaft of the generator 22 or 143a,143b during conditions of light or no load may be maintained by applying an electrical load to the generator 22 or 143a, 143b. This in turn ensures that the loading on the generator 22 or 143a,143b is sufficient to prevent an overspeed condition. The loading is accomplished by operating the converter 64 to draw power from the rectifier/filter circuit 58 and returning the power to the electrical power windings of the generator 22 or 140,142. This circulation of power from generator 22 through the rectifier/filter circuit 58 and the converter 64 back to the generator 22 introduces parasitic losses which load the generator 22 to prevent an overspeed condition.

Figure 8:
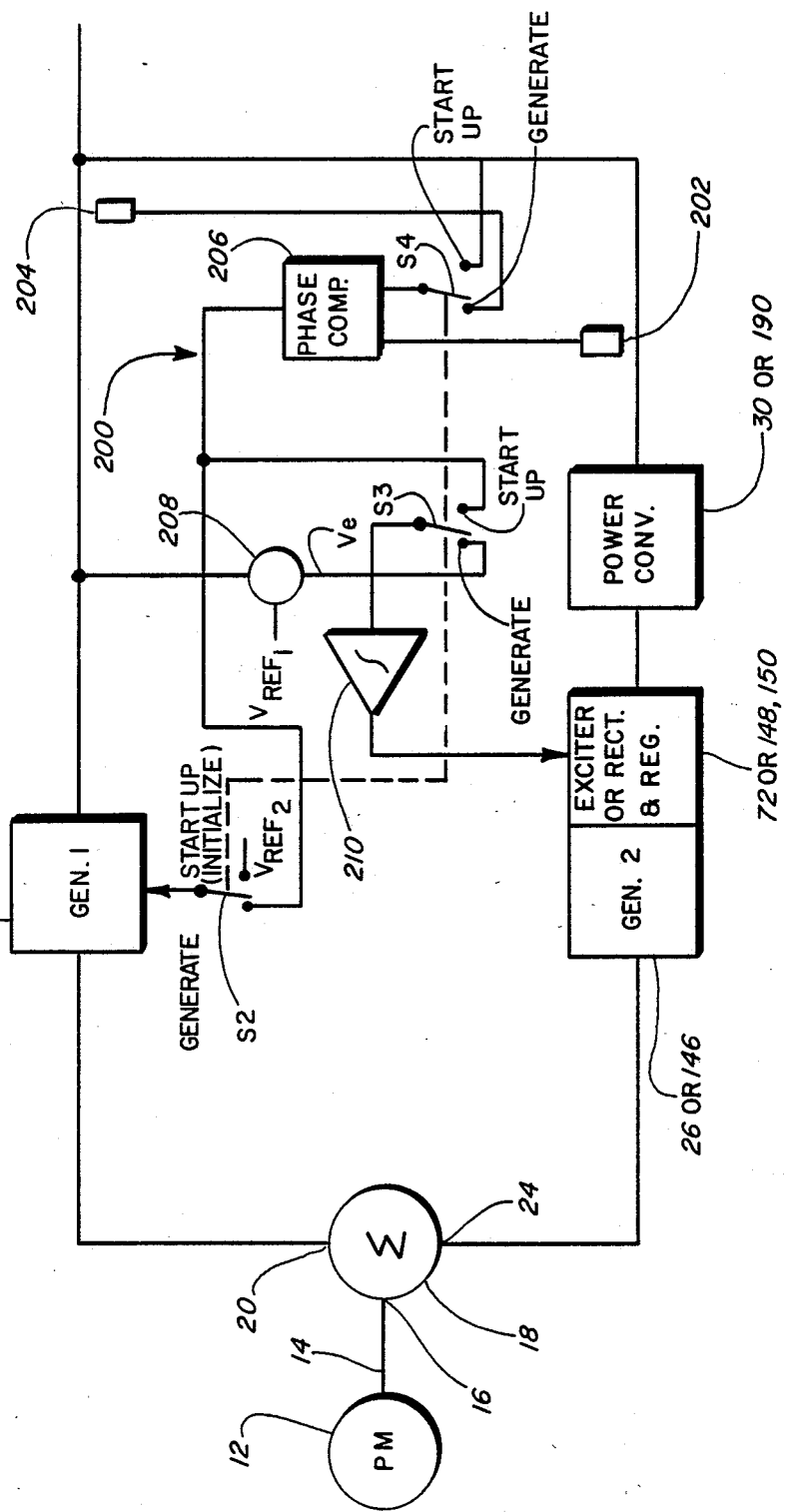
FIGS. 8 and 9 are simplified block diagrams of still further embodiments of the invention.

Referring now to FIG. 8, there is shown a further embodiment of the present invention. Elements in common with the preceding figures are assigned like reference numerals.

The embodiment includes the first or fixed-frequency generator 22 or 143a,143b and the second or wild-frequency generator 26 or 146. If the wound-field generator 26 is utilized, the generator is excited by the exciter 72 and the generator 26 output is coupled to the power converter 30. Alternatively, if the permanent magnet generator 146 is utilized, the rectifier 148 and the DC/DC converter 150 are employed together with an inverter 190 coupled to the output of the first generator 22. The power converter 30 or the inverter 190 develop constant-frequency power. The inverter 190 may be controlled by a conventional control circuit (not shown).

The power developed by the system is regulated by a control 200 which is responsive to the output current of the converter 30 or inverter 190, as detected by a current sensor 202, and the output current of the first generator 22, as detected by a current sensor 204. When operating in the generating mode, a phase comparator 206 compares the phases of the currents detected by the sensors 202,204 and develops a signal representative of the phase difference therebetween. This signal, representative also of the first generator power factor, controls the excitation of the generator 22 or the output of the PMG's 143a,143b to minimize circulating currents between the fixed-frequency generator 22 and the power converter 30 or the inverter 190. The correct phase relationship between the first generator 22 output and the converter 30 or inverter 190 output is thereby maintained to minimize system losses.

In the preferred embodiment, the control 200 including the phase comparator 206 forces the phase displacement of the first generator output current and the converter 30 or inverter 190 output current toward zero degrees. A different phase relationship between these currents may be maintained, if desired.

A summing junction 208 receives one of the phase output voltages of the first generator 22 or 143b and subtracts a reference voltage $V_{REF1}$ therefrom to develop an error signal $V_e$. During operation in the generating mode, the error signal $V_e$ is integrated by an integrator 210 and the integrated error signal is used to regulate the output of the generator 26 or 146. This, in turn, regulates the POR voltage.

It should be noted that during operation in the generating mode, the power converter 30 or inverter 190 output frequency is maintained at 400 hz. or at any other desired output frequency for the power generating system. This, together with the excitation control for the generator 20 or 143a,143b, causes the motive power shaft of the generator 22 or 143a,143b to rotate at a desired constant speed corresponding to the desired frequency.

The embodiment shown in FIG. 8 may be operated in a start-up mode after the prime mover is operating within its normal speed range so that the system is brought up to a condition of regulated output voltage and frequency. The "start-up" mode is thus distinct from the "starting" mode described previously since the latter mode operates the power supply system to bring the prime mover up to self-sustaining speed. During operation in the start-up mode, and assuming the generator 22 is used a series of ganged switches S2–S4 are moved to a start-up position. The switch S2 connects the exciter of the first generator 22 to a source of potential $V_{REF2}$ so that the generator 22 is provided with constant excitation. DC input power is thereafter applied to the power converter 30 or the inverter 190 and the converter or inverter is controlled so that the generator 22 operates as a synchronous motor to force the shaft speed of the generator 22 to be equal to the desired constant speed.

During operation in the start-up mode, the output power of the wild-frequency generator 26 or 146 is regulated by controlling the rectifier 148 and the DC/DC converter 150 in accordance with the integrated phase error between the output voltage of the first generator 22 and the output current of the converter 30 or inverter 190.

Once the generator 22 is operating at the desired constant speed, the switches S2–S4 may be moved to the generator positions shown in FIG. 8 so that operation in the generating mode begins.

It should be noted that the DC input power might be obtained from an AC or DC external power source or from the generator 26 or 146 if it is developing sufficient power at this time. In the former case, if an AC external power source is used a rectifier circuit would be necessary to convert the AC output of the power source 26 to DC power. In the latter case, the rectifier 148 and the DC/DC converter 150 would develop the DC power.

Alternatively, the generator 22 may be operated as an induction motor in the start-up mode by shorting the field windings thereof and connecting external power directly to the windings of the generator 22 to bring the shaft of the generator 22 up to the desired speed.

The start-up mode may alternatively be modified by eliminating the switches S2–S4, shorting the field windings of the generator 22 and operating the converter 30 or inverter 190 to cause the shaft speed of the generator 22 to approach the desired speed. Again, this causes the generator 22 to be operated as an induction motor. Power for the converter 30 or inverter 190 may be obtained from the generator 26 or 146 or from a separate power source, as before. If necessary or desirable, the converter or inverter output frequency and voltage may be adjusted gradually at a constant V/F ratio so that the first generator 22 is accelerated in controlled fashion to minimize inrush currents. Once the converter or inverter output frequency is at 400 hz. or at any other desired output frequency, the system is in the generating mode.

The start-up mode of operation when the PMG's 143a,143b are used in place of the generator 22 is substantially the same as described above, except that excitation need not, of course, be provided to the generators 143a,143b in order to bring them up to speed.

As previously noted generally above, during operation in the generating mode of the embodiment of FIG. 8, the phase comparator 206 compares the phase of the current from the converter 30 or inverter 190 with the phase of the current from the generator 22 or 143a,143b to derive a field control signal for the first generator. Also, the integrator 210 integrates the voltage error signal $V_e$ to derive a control signal for controlling the power developed by the second generator 26 or 46. Consequently, the converter 30 or inverter 190 regulates the POR voltage and the excitation of the first generator 22 or control over the output of the PMG's 143a,143b (similar to the embodiment of FIG. 6) is used to regulate the relative phase displacement of the generator 22 or 143a,143b output current with respect to the converter 30 or inverter 190 current. This phase displacement control maintains proper load balance between the generators 22 (or 143a,143b) and 26 (or 146) to minimize circulating currents between the generator 22 or 143a,143b and the converter 30 or inverter 190. This, in turn, minimizes system losses.

Referring now to FIG. 9, there is shown a still further embodiment of the invention. In the previous embodiments, the power from the first generator 22 or 143a,143b is coupled in parallel with the power developed by the wild-frequency generator 26 or 146. Illustrated in FIG. 9 is an embodiment in which the converter 30 or inverter 190 output is connected in series with the power windings of the first generator 22 or 143a,143b. That is, the converter 30 or inverter 190 develops polyphase power on conductors 250a,250b, 250c which are connected in series with, for example, windings 252a–252c, respectively, of the generator 22. In FIG. 9, the exciter 70 is not shown for purposes of simplicity.

In this embodiment, the system is operated in a generating mode by sensing the POR voltage as denoted at 254 and providing a control signal voltage, for example by means of amplifier 256, to the exciter 70 so that the generator 22 regulates the POR voltage. A phase comparator 258 compares the phase voltage outputs of the converter 30 or inverter 190 with the phase voltages at the point-of-regulation and develops a control signal which is coupled to the exciter 72 or the DC/DC converter 150. The power developed by the generator 26 or 146 is consequently controlled such that its frequency follows the frequency of the voltage from the converter 30 or inverter 190.

The system shown in FIG. 9 may also be operated in the start-up mode. In this case, a switch S5 is moved to a starting position so that a constant excitation voltage $V_{REF3}$ is delivered to the exciter 70 of the generator 22. A series of contactors CON1–CON3 are closed so that the output windings 252a–252c of the generator 22 are connected to a neutral voltage provided by the converter 30 or inverter 190. The closed contactors CON-1–CON3 provide a path for currents to flow through the windings 252a–252c. The converter 30 or inverter 190 is then operated to apply controlled power to the generator windings to force the generator 22 to operate as a synchronous or induction motor at the desired constant speed. Again, input power for the converter 30 or inverter 190 may be provided by an external source or from the output of the wild-frequency generator 26 or 146.

Operation in the generating and start-up modes in the FIG. 9 embodiment for the case where the PMG's 143a,143b are used in place of the generator 22 is analogous to that described above, taking into account the differences between wound-field and permanent magnet generators.

Once the motive power shaft of the generator 22 is rotating at the desired constant speed, the contactors CON1–CON3 are opened and a load is coupled to the windings of the generator 22 to thereby place the system in the generating mode.

In the embodiments of FIGS. 3, 8 and 9, the switches 51–55 are symbolic in the sense that they may be dispensed with provided that their function is assumed by control circuits which are capable of switching the appropriate signals to the respective system components as necessary.

Each of the foregoing embodiments may be modified to provide limited emergency power in the event the prime mover ceases to operate yet continues to rotate due to the application of external mechanical power thereto. For example, in the case of an aircraft engine it may occur that the engine ceases to operate under its own power yet continues to rotate due to air flow over the turbine blades of the engine. Such a condition, known as "wind milling" can provide sufficient mechanical power to allow limited electrical power to be generated by the second generator 26 or 146. In this case, maximum rotational speed of the generator 26 or 146 is obtained by mechanically locking or otherwise preventing rotation of the shaft 20 of the differential. The wild frequency machine 26 or 146 is therefore driven at a speed proportional to that of the prime mover so that a limited amount of electrical power is developed in the generator windings. This power is typically not of a fixed frequency, and hence some type of power converter must be used to convert the power either into DC or fixed-frequency AC power.

Each of the foregoing embodiments may also be modified to permit generation of fixed-frequency AC power at relatively low prime mover speeds. In each of the embodiments described previously, power flow takes place from the prime mover through the differential and into the wild frequency machine. In this modification, the power flow is reversed at low prime mover speeds so that the wild-frequency generator is operated as a motor when prime mover speed is below the speed required to operate the fixed frequency machine 22 to provide the desired output frequency. In this case, the power converter 30 or another controllable power source delivers power to the windings of the generator 26 or 146 when make-up speed must be provided to the differential 18. If the permanent magnet generator 146 is utilized, this machine operates as a permanent magnet motor provided alternating current power of the proper frequency is applied to the windings. If the generator 26 is used, it may be operated either as a synchronous motor, in which case constant excitation is provided to the field windings of the generator or as an induction motor, in which case the field windings are shorted.

We claim:

1. A power supply system for developing electrical power at a system output from variable-speed motive power produced by a prime mover, comprising:
a differential speed summer having a first shaft coupled to the prime mover and further having second and third shafts;
a first generator coupled to the second shaft of the differential;
a second generator coupled to the third shaft of the differential;
a power conditioner for conditioning the total output power of the second generator; and
means for regulating a parameter of the conditioned total output power of the second generator to cause the motive power shaft of the first generator to rotate at a constant speed so that such generator develops constant-frequency AC output power at the system output;
wherein the power conditioner comprises an inverter and the regulating means includes means for controlling the inverter so that it produces output power at a desired output frequency and wherein the inverter is coupled to the first generator output so that the first generator develops output power at a frequency equal to the inverter output frequency.

2. The power supply system of claim 1, wherein the second generator is of the wound-field type and wherein the regulating means includes means for controlling the excitation of the second generator so that the speed of the second generator motive power shaft varies with changes in prime mover speed.

3. The power supply system of claim 1, wherein the second generator comprises a permanent magnet generator and the power conditioner includes a rectifier coupled to the output of the second generator and a DC/DC converter coupled to the rectifier, the regulating means including means for controlling the DC/DC converter so that the speed of the second generator motive power shaft varies with changes in prime mover speed.

4. The power supply system of claim 1, further including a phase displacement control responsive to the inverter output frequency for controlling the first generator output so that circulating currents between the first generator output and the inverter output are controlled to minimize losses.

5. The power supply system of claim 1, wherein the regulating means includes a control responsive to the speed of one of the shafts of the differential for controlling the conditioned total output power of the second generator.

6. The power supply system of claim 5, wherein the control is further responsive to first and second current sensors which sense the output current of the first and second generators, respectively.

7. The power supply system of claim 6, wherein the control is responsive to a position sensor and a differentiator coupled to the position sensor which together develop a speed signal representing the speed of the second differential shaft.

8. The power supply system of claim 7, wherein the control includes a first summing circuit for summing the speed signal with a reference to derive an error signal, a first integrator for integrating the error signal, a multiplier for multiplying the integrated error signal with the signal developed by the first current sensor to derive a multiplied signal, a second summing circuit for summing the integrated error signal with the multiplied signal and the output of the second current sensor and a second integrator for integrating the output of the second summing circuit to derive a control signal.

9. The power supply system of claim 8, wherein the second generator comprises a wound-field generator having an exciter responsive to the control signal.

10. The power supply system of claim 8, wherein the second generator comprises a permanent magnet generator and further including a controllable rectifier and a DC/DC converter responsive to the control signal and coupled to the output of the second generator for controlling the power developed thereby.

11. The power supply system of claim 1, wherein the first generator includes two sets of output windings each of which conducts a portion of the total output power of the first generator and further including a first rectifier coupled to one of the first generator output windings to derive DC power on a DC bus for DC loads and a DC/AC converter coupled between the DC bus and the system output for converting the DC power into AC power which is combined with the power conducted by the other first generator output winding.

12. The power supply system of claim 11, further including a second rectifier coupled between the second generator and the DC bus for rectifying the output power of the second generator whereby the first and second generators are capable of supplying power to DC loads.

13. The power supply system of claim 11, wherein the system is capable of driving variable load magnitudes and further including a converter control coupled to the DC/AC converter which operates same so that the power conducted by the one winding of the first generator is circulated through the first rectifier, the DC/AC converter and the other winding of the first generator when the load magnitude is small.

14. The power supply system of claim 1, further including a first generator control responsive to the system output voltage at a point-of-regulation (POR) for controlling the power developed by the first generator to in turn regulate the POR voltage.

15. The power supply system of claim 1, further including means for controlling the first and second generators in a starting mode to start the prime mover.

16. The power supply system of claim 15, wherein the controlling means includes means for operating the first generator as a motor to drive the second and third differential shafts and means for electrically loading the second generator once the first generator is operating as a motor so that torque is developed which is returned through the differential to the prime mover to start same.

17. The power supply system of claim 16, wherein the power conditioner includes an inverter and wherein the operating means includes a source of AC power and a converter control for controlling the inverter to develop AC power to accelerate the first generator to a particular speed, at which time the source of AC power is connected to the first generator to cause it to operate as a motor.

18. The power supply system of claim 17, wherein the first generator includes two sets of output windings and further including a rectifier coupled between one of the output windings and the inverter, wherein the operating means further includes means for connecting the source of AC power to the rectifier so that DC input power is provided to the inverter while the inverter is developing the AC power.

19. The power supply system of claim 7, wherein the means electrically loading the second generator comprises means for operating the inverter so that it develops power which is combined with the power developed by the source of AC power.

20. A power supply system for developing AC and DC output power from variable-speed motive power produced by a prime mover, comprising:
   first and second wound-field generators each having a motive power shaft, an exciter which receives field excitation and electrical power windings;
   a differential having first through third motive power shafts coupled to the prime mover and to the motive power shafts of the first and second generators, respectively;
   a control for controlling the field excitation of the second generator to in turn operate the first generator at a constant speed and the second generator at a variable speed so that the first generator develops constant-frequency AC output power at an output thereof and the second generator develops variable-frequency AC power; and
   a rectifier circuit for rectifying the variable-frequency output of the second generator to develop the DC output power.

21. The power supply system of claim 20, further including an inverter coupled between the rectifying means and the output of the first generator for developing constant-frequency AC power from the DC power developed by the rectifying means which is combined with the AC output power from the first generator.

22. The power supply system of claim 20, wherein the first generator includes first and second sets of output windings each of which conducts a portion of the total output power of the generator and wherein a second rectifier circuit is coupled between one of the sets of output windings and a DC bus which in turn receives the DC output power developed by the first rectifier circuit.

23. The power supply system of claim 22, further including DC/AC converter coupled between the DC bus and the first set of output windings for converting the DC power on the DC bus into AC power at the same frequency as the AC output power.

24. The power supply system of claim 20, further including means for controlling the field excitation of the first generator for controlling the output voltage of the first generator at a point-of-regulation.

25. The power supply system of claim 20, wherein the control is responsive to a position sensor an a differentiator which together develop a speed signal representing the speed of one of the shafts of the differential.

26. The power supply system of claim 25, wherein the control is further responsive to first and second current sensors which sense the output currents of the first and second generators, respectively.

27. The power supply system of claim 26, wherein the control includes a first summing circuit for summing the speed signal with a reference to derive an error signal, a first integrator for integrating the error signal, a multiplier for multiplying the integrated error signal with the signal developed by the first current sensor to derive a multiplied signal, a second summing circuit for summing the integrated error signal with the multiplied signal and with the output of the second current sensor and a second integrator for integrating the output of the second summing circuit to derive a control signal which controls the second generator field excitation.

28. The power supply system of claim 20, further including means for controlling the first and second generators in a starting mode to start the prime mover.

29. The power supply system of claim 28, wherein the controlling means includes means for operating the first generator as a motor to drive the second and third differential shafts and means for electrically loading the second generator once the first generator is operating as a motor so that torque is returned through the differential to the prime mover to start same.

30. The power supply system of claim 29, further including an inverter, a source of AC power and converter control for controlling the inverter to develop AC power to accelerate the first generator to a particular speed, at which time the source of AC power is connected to the first generator to cause it to operate as a motor.

31. The power supply system of claim 30, wherein the first generator includes two sets of output windings and further including an additional rectifier coupled between one of the output windings and the inverter and means for connecting the source of AC power to the additional rectifier so that DC input power is provided to the inverter while the inverter is developing the AC power.

32. The power supply system of claim 30, wherein the means for electrically loading the second generator comprises means for operating the inverter so that it develops power which is combined with the power developed by the source of AC power.

33. A power supply system for developing constant-frequency AC output power and DC output power from variable-speed motive power produced by a prime mover, comprising:
   a differential speed summer having a first shaft coupled to the prime mover and second and third shafts;
   a first generator coupled to the second shaft of the differential having first and second sets of windings which develop first and second power outputs, respectively;
   a second generator coupled to the third shaft of the differential which develops output power at an output thereof;
   a first rectifier coupled between the output of the second generator and a DC bus for rectifying the output power developed thereby;
   a control circuit for regulating the rectified second generator output whereby the first generator is driven at a constant speed by the second differential shaft so that constant-frequency AC power is developed at the first and second power outputs of the first generator;
   a second rectifier coupled between the second set of windings of the first generator and the DC bus for rectifying the constant-frequency power developed thereby wherein the outputs of the first and second rectifiers are combined to produce the DC output power on the DC bus; and a DC/AC converter coupled between the DC bus and the first set of windings of the first generator for deriving constant-frequency AC power from the combined outputs of the rectifiers on the DC bus whereby such AC power is combined with the first power output of the first generator to produce the constant-frequency AC output power.

34. The power supply system of claim 33, wherein the first and second generators comprise permanent magnet generators and further including a DC/DC converter coupled between the first rectifier and the DC bus wherein the DC/DC converter is responsive to the control circuit.

35. The power supply system of claim 33, wherein the second generator comprises wound-field machine having an exciter and wherein the control circuit is coupled to the exciter of the second generator to control the power developed thereby.

36. The power supply system of claim 35, wherein the first generator comprises a wound-field machine having an exciter and further including an additional control circuit coupled to the exciter of the first generator for controlling the output voltage of the system at a point-of-regulation.

37. The power supply system of claim 33, further including means for controlling the first and second generators in a starting mode to start the prime mover.

38. The power supply system of claim 37, wherein the controlling means comprises a converter control for the DC/AC converter wherein the converter control operates the DC/AC converter to develop AC power in the starting mode to accelerate the first generator and the second differential shaft to a particular speed, following which a source of AC power is connected to the first generator to operate same as a motor and the converter control operates the DC/AC converter to place an electrical load on the second generator so that torque is developed which is returned through the differential to the prime mover to start same.

39. The power supply system of claim 38, wherein input power for the DC/AC converter during the time the first generator is accelerating is provided by the source of AC power and the second rectifier.

40. The power supply system of claim 38, wherein input power for the DC/AC converter during the time the first generator is accelerating is provided by an external source of DC power.

41. A power supply system for developing constant-frequency AC output power at a system output from variable-speed motive power produced by a prism mover, comprising:

first and second wound-field generators each having a motive power shaft, an exciter which receives field excitation and electrical power windings;

a differential having first through third motive power shafts coupled to the prime mover and to the motive power shafts of the first and second generators, respectively;

a power converter coupled to the second generator including an inverter for developing constant-frequency power at an inverter output from the total power output of the second generator;

means for coupling the inverter output to the power windings of the first generator wherein the inverter output and the power windings of the first generator form the system output; and a control for controlling the field excitation of the first and second generators such that the first generator develops AC power at a constant frequency equal to the frequency of the power developed by the inverter.

42. The power supply system of claim 41, wherein the inverter is connected in parallel with the power windings of the first generator.

43. The power supply system of claim 42, wherein the control includes a phase comparator for developing a control signal representing the phase difference between the output currents of the power converter and the first generator wherein the control signal controls the field excitation of the first generator.

44. The power supply system of claim 42, wherein the control includes a summing junction for developing an error signal representing the deviation of the voltage of the AC output power from a reference and an integrator for integrating the error signal to derive a control signal which controls the field excitation of the second generator.

45. The power supply system of claim 41, wherein the inverter is connected in series with the power windings of the first generator.

46. The power supply system of claim 45, wherein the control includes a phase comparator for developing a control signal representing the phase difference between the voltages developed by the first generator and the power converter wherein the control signal controls the field excitation of the second generator.

47. The power supply system of claim 45, wherein the control includes means for controlling the field excitation of the first generator in accordance with the output voltage of the AC output power.

48. A method of bringing a power supply system up to a condition of regulated output frequency once a prime mover which provides motive power to the system is within a speed operating range wherein the power supply includes a differential having first through third shafts coupled to the prime mover and to motive power shafts of first and second generators, respectively, and a power converter coupled between electrical power outputs of the first and second generators whereby the outputs of the first generator and the power converter are combined to develop AC output power at a system output, comprising the steps of:

(a) applying a source of input power to the power converter;

(b) operating the power converter to provide power to the first generator to operate it as a motor to thereby force the motive power shaft thereof to rotate at a particular speed; and (c) thereafter controlling the frequency of the power converter output to maintain the speed of the first generator motive power shaft constant so that the first generator and power converter together develop constant-frequency AC power.

49. The method of claim 48, wherein the first and second generators are wound-field machines having exciters which receive field excitation and including the further step of providing constant field excitation to the first generator while the power converter is being operated during step (b).

50. The method of claim 49, including the further step of controlling the field excitation of the second generator while the power converter is being operated during step (b) in accordance with the integrated phase error between the output voltage of the first generator and the output current of the power converter.

51. The method of claim 48, wherein the first and second generators are permanent magnet machines and the power converter comprises a rectifier, a DC/DC converter and an inverter coupled between the output of the second generator and the system output, including the further step of controlling the rectifier and the DC/DC converter in accordance with the integrated phase error between the output voltage of the first generator and the output current of the inverter while the power converter is being operated during step (b).

52. A method of bringing a prime mover up to self-sustaining speed wherein the prime mover is coupled to a power supply of the type including a differential speed summer having a first shaft coupled to the prime mover, a second shaft coupled to a motive power shaft of a first generator and a third shaft coupled to a motive power shaft of a second generator having an output coupled to a power converter, the power converter including an output coupled to an output of the first generator, comprising the steps of:
(a) applying a source of power to the power converter;
(b) operating the power converter so that it develops AC power which is applied to the first generator to accelerate the motive power shaft of same;
(c) applying an AC power source to the first generator when the motive power shaft reaches a particular speed to operate same as a motor so that the motive power shaft of the second generator rotates and thereby causes the second generator to develop output power; and
(d) placing an electrical load on the second generator so that starting torque is developed which is transferred by the differential to the prime mover to bring same up to self-sustaining speed.

53. The method of claim 52, wherein the step (d) includes the step of controlling the power converter to combine the output power of the second generator with power developed by the AC power source to thereby place the electrical load on the second generator.

54. The method of claim 52, wherein the step (b) includes the step of controlling the converter such that it supplies power at a constant V/F relationship to the first generator.

55. The method of claim 52, wherein the first generator is a wound-field machine and wherein the step (c) includes the step of coupling the AC power source to the first generator when the first generator reaches synchronous speed whereby the generator operates as a synchronous motor.

56. The method of claim 52, wherein the step (d) includes the step of operating the power converter to place the electrical load on the second generator.

57. A method of operating a power supply system including a differential having first through third shafts coupled to a prime mover and to motive power shafts of first and second generators, respectively, and a power converter coupled to the second generator for conditioning the output power of the second generator, comprising:
operating the first and second generators when the prime mover speed is within an operating range so that the first generator and the power conditioner develop constant-frequency power at a system output; and
preventing rotation of the motive power shaft of the first generator and controlling the power converter so that it develops constant-frequency AC power when the prime mover speed is below the operating range.

58. A method of operating a power supply system including a differential having first through third shafts coupled to a prime mover and to motive power shafts of first and second generators, respectively, and a power converter coupled to the second generator for conditioning the output power of the second generator, comprising:
operating the first and second generators when the prime mover speed is within an operating range so that the first generator and the power conditioner develop constant-frequency power at a system output; and
applying a source of power to the second generator to operate same as a motor so that the motive power shaft of the first generator is rotated at a constant speed whereby the first generator continues to develop constant-frequency AC power when the prime mover speed drops below the operating range.

59. A power supply system for developing constant-frequency AC output power from variable-speed motive power produced by a prime mover, comprising:
first and second generators each having a motive power shaft wherein the second generator is of the permanent magnet type;
a differential having first through third motive power shafts coupled to the prime mover and to the motive power shafts of the first and second generators, respectively;
a rectifier and DC/DC converter coupled to the output of the second generator for converting the power output of the second generator into DC power;
an inverter coupled to the DC/DC converter for developing constant-frequency AC power at an inverter output from the DC power wherein the inverter output is coupled to the electrical power windings of the first generator; and
a control coupled to the first generator including a phase comparator for developing a control signal representing the phase difference between the output current of the inverter and the first generator wherein the control signal controls the power output of the first generator;
whereby the first generator and the inverter develop the constant-frequency AC output power.

60. The power supply system of claim 59, wherein the inverter is connected in parallel with the electrical power windings of the first generator.

61. The power supply system of claim 59, wherein the inverter is connected in series with the electrical power windings of the first generator.

62. The power supply system of claim 59, wherein the control includes a summing junction for developing an error signal representing the deviation of the voltage of the constant-frequency AC output power from a reference and an integrator for integrating the error signal to derive a second control signal which controls the DC/DC converter.

63. The power supply system of claim 59, wherein the first generator is of the wound field type and wherein the means for controlling the output power of the first generator comprises an exciter.

64. The power supply system of claim 59, wherein the first generator is of the permanent magnet type and wherein the means for controlling the output power of the first generator comprises a regulator coupled to the first generator.

* * * * *